United States Patent
Biddle et al.

(10) Patent No.: US 9,080,715 B2
(45) Date of Patent: Jul. 14, 2015

(54) SUPPORT DEVICE FOR SUSPENDING AN ARTICLE FROM A HORIZONTAL OBJECT

(71) Applicant: Steelcase Inc., Grand Rapids, MI (US)

(72) Inventors: Fredric J. Biddle, Kalamazoo, MI (US); John Hamilton, San Rafael, CA (US); Daniela Stahl, Denzlingen (DE)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 14/044,118

(22) Filed: Oct. 2, 2013

(65) Prior Publication Data

US 2015/0090848 A1    Apr. 2, 2015

(51) Int. Cl.
   *F16M 13/02*     (2006.01)
(52) U.S. Cl.
   CPC .................................. *F16M 13/022* (2013.01)
(58) Field of Classification Search
   CPC ...... F16M 13/02; F16M 13/022; A47B 13/16
   USPC ............... 248/222.51, 692, 558, 315, 316.4,
         248/229.12, 229.22, 316.5, 316.6, 229.13,
         248/229.14, 229.23, 229.24, 309.1, 231.71;
                                     24/522, 523, 457
   See application file for complete search history.

(56) References Cited

U.S. PATENT DOCUMENTS

| | | | |
|---|---|---|---|
| 288,058 A * | 11/1883 | Holister | 248/315 |
| 369,971 A * | 9/1887 | Stillman | 248/515 |
| 477,270 A | 6/1892 | Roos | |
| 501,392 A * | 7/1893 | Wiedenmann | 224/461 |
| 561,376 A * | 6/1896 | Crawford | 24/457 |
| 611,122 A | 9/1898 | Hess et al. | |
| 765,046 A * | 7/1904 | Shee et al. | 24/457 |
| 965,707 A * | 7/1910 | Hammond | 248/316.7 |
| 977,835 A * | 12/1910 | Piscator | 248/514 |
| 1,244,599 A * | 10/1917 | Goozey | 24/598.3 |
| 1,293,126 A | 2/1919 | Kuffel | |
| 1,392,716 A | 10/1921 | Spraggins | |
| 1,646,068 A * | 10/1927 | Rosner | 248/316.4 |
| 1,794,976 A * | 3/1931 | Mueller | 439/803 |
| 2,206,052 A * | 7/1940 | Schoeninger | 59/85 |
| 2,225,031 A * | 12/1940 | Caldwell | 24/114.5 |
| 2,461,201 A | 2/1949 | Ellis | |
| 2,461,936 A * | 2/1949 | Stone | 248/222.12 |
| 2,473,086 A | 6/1949 | Gonzalez | |
| 2,506,119 A * | 5/1950 | Tregear | 248/222.51 |
| 2,532,255 A | 11/1950 | Davis | |

(Continued)

FOREIGN PATENT DOCUMENTS

GB    2380762 A    4/2003
WO    2011154055 A1    12/2011

*Primary Examiner* — Michael Safavi

(57) ABSTRACT

In some embodiments, an apparatus includes an inner support member having an outer surface and an outer support member rotatably coupled to the inner support member and having an inner surface configured to matingly engage the outer surface of the inner support member. One of the outer surface of the inner support member and the inner surface of the outer support member defines a concave surface and the other defines a convex surface. The outer support member and the inner support member are collectively configured to be releasably coupled to an edge of an object having a substantially horizontal surface. A capture region is defined by at least one of the outer support member or the inner support member and is configured to receive a portion of an article such that the article can be suspended from the object when the inner and the outer support members are coupled thereto.

21 Claims, 11 Drawing Sheets

(56) References Cited

U.S. PATENT DOCUMENTS

| | | | |
|---|---|---|---|
| 2,555,890 A | 6/1951 | Korth | |
| 2,635,797 A | 4/1953 | Siebert | |
| 2,675,593 A * | 4/1954 | Okell | 24/459 |
| 2,794,537 A * | 6/1957 | Holliday | 198/867.15 |
| 2,826,206 A * | 3/1958 | Slater | 131/257 |
| 2,888,725 A * | 6/1959 | Cudd | 24/531 |
| 2,901,204 A * | 8/1959 | Davis | 248/229.13 |
| 2,995,332 A * | 8/1961 | Davis | 248/229.13 |
| 3,030,681 A * | 4/1962 | Phillips | 248/229.15 |
| 3,056,412 A * | 10/1962 | Wolfe | 131/328 |
| 3,630,475 A | 12/1971 | Barry | |
| 3,773,288 A | 11/1973 | Bolton | |
| D229,870 S | 1/1974 | Czarny | |
| 3,860,210 A | 1/1975 | Berardinelli et al. | |
| 3,861,633 A | 1/1975 | Rappleye et al. | |
| 3,904,161 A * | 9/1975 | Scott | 248/541 |
| D244,883 S | 6/1977 | Rohrmuller | |
| D244,910 S | 7/1977 | Chasen et al. | |
| 4,103,854 A * | 8/1978 | Pliml et al. | 248/235 |
| 4,118,001 A | 10/1978 | Serkez | |
| 4,194,714 A | 3/1980 | Schultz | |
| 4,210,302 A | 7/1980 | Serkez | |
| D256,738 S | 9/1980 | Dockery | |
| 4,240,604 A * | 12/1980 | Brach | 248/316.5 |
| 4,624,432 A * | 11/1986 | Salacuse | 248/316.5 |
| 4,653,716 A * | 3/1987 | Sakaguchi | 248/316.5 |
| 4,685,701 A | 8/1987 | Amundson et al. | |
| 4,728,071 A * | 3/1988 | Salacuse | 248/316.5 |
| D296,299 S | 6/1988 | Bsell | |
| 4,759,252 A * | 7/1988 | Occhipinti | 84/387 A |
| D297,074 S | 8/1988 | Burke et al. | |
| 4,802,646 A * | 2/1989 | Cattani | 248/316.5 |
| D300,882 S | 5/1989 | Olson | |
| 4,940,261 A | 7/1990 | Vine | |
| 4,978,090 A * | 12/1990 | Wichert et al. | 248/74.1 |
| 4,978,093 A | 12/1990 | Kennedy | |
| D314,864 S | 2/1991 | Creed | |
| 5,044,588 A | 9/1991 | Gunter | |
| 5,082,219 A | 1/1992 | Blair | |
| 5,094,417 A | 3/1992 | Creed | |
| 5,246,190 A | 9/1993 | Swirkal | |
| 5,344,115 A * | 9/1994 | Mayne et al. | 248/514 |
| 5,395,080 A | 3/1995 | Smith | |
| 5,531,416 A * | 7/1996 | Remmers | 248/222.51 |
| 5,594,419 A | 1/1997 | Lo | |
| D377,866 S | 2/1997 | Samples | |
| 5,618,015 A * | 4/1997 | Morini | 248/74.2 |
| D384,505 S | 10/1997 | Stewart | |
| 5,758,851 A * | 6/1998 | Remmers | 248/251 |
| 5,911,618 A * | 6/1999 | Dailey | 450/86 |
| D412,658 S | 8/1999 | Goodman et al. | |
| 5,984,250 A | 11/1999 | Connor | |
| 5,989,006 A | 11/1999 | Godeau et al. | |
| D426,764 S | 6/2000 | Szabo | |
| D429,899 S | 8/2000 | Schwartz | |
| D435,733 S | 1/2001 | Osterholt | |
| 6,186,383 B1 * | 2/2001 | Kobdish | 224/420 |
| 6,345,796 B1 | 2/2002 | Neuman | |
| D456,280 S | 4/2002 | Osterholt et al. | |
| D458,536 S | 6/2002 | Samelson | |
| D459,899 S | 7/2002 | Smith | |
| D462,172 S | 9/2002 | Aurelio, Jr. | |
| D464,867 S | 10/2002 | Samelson | |
| D465,653 S | 11/2002 | Fchillo | |
| 6,530,548 B2 | 3/2003 | Pizzirso | |
| 6,604,725 B1 * | 8/2003 | Thullen et al. | 248/316.5 |
| D481,646 S | 11/2003 | Bonifacio | |
| D489,249 S | 5/2004 | Moore | |
| D515,450 S | 2/2006 | Griesinger | |
| D517,732 S | 3/2006 | Osterholt et al. | |
| D526,233 S | 8/2006 | Hollis | |
| 7,175,143 B1 | 2/2007 | Ho | |
| D540,040 S | 4/2007 | Madirazza | |
| 7,322,554 B2 | 1/2008 | Caroselli et al. | |
| 7,347,065 B1 | 3/2008 | DeGolyer | |
| D569,714 S | 5/2008 | Stewart et al. | |
| D575,063 S | 8/2008 | Sandler | |
| D576,474 S | 9/2008 | Given | |
| D588,444 S | 3/2009 | Shamlian | |
| 7,540,069 B2 * | 6/2009 | Okamoto | 24/16 PB |
| D596,859 S | 7/2009 | Castaline et al. | |
| D600,451 S | 9/2009 | Chvetsova | |
| D627,209 S | 11/2010 | Aziz et al. | |
| 7,841,571 B1 | 11/2010 | Ghormley | |
| D632,952 S | 2/2011 | Dablemont | |
| D642,045 S | 7/2011 | Sweeney | |
| D642,450 S | 8/2011 | Freese | |
| D644,438 S | 9/2011 | Brucker | |
| D645,336 S | 9/2011 | Drazin | |
| 8,061,669 B2 | 11/2011 | Yap et al. | |
| 8,083,202 B1 | 12/2011 | Hutchison | |
| D652,711 S | 1/2012 | Lee et al. | |
| 8,162,276 B2 | 4/2012 | Fathi et al. | |
| D668,941 S | 10/2012 | Taurins | |
| 8,308,125 B2 | 11/2012 | Losaw | |
| 8,544,154 B2 * | 10/2013 | Lewis | 24/488 |
| 2002/0129619 A1 | 9/2002 | Wolff | |
| 2003/0080267 A1 * | 5/2003 | Eslick | 248/229.1 |
| 2004/0108432 A1 | 6/2004 | Weitzman | |
| 2004/0118989 A1 | 6/2004 | Sidelman | |
| 2004/0195484 A1 | 10/2004 | Sheeran | |
| 2005/0082319 A1 | 4/2005 | Caroselli et al. | |
| 2006/0108497 A1 | 5/2006 | Miranda | |
| 2008/0236195 A1 | 10/2008 | Woebke | |
| 2008/0296466 A1 | 12/2008 | Alfin | |
| 2009/0108164 A1 | 4/2009 | Washio et al. | |
| 2011/0186702 A1 | 8/2011 | Broadley et al. | |
| 2012/0189230 A1 | 7/2012 | King | |
| 2012/0273640 A1 * | 11/2012 | Fathi et al. | 248/316.5 |

* cited by examiner

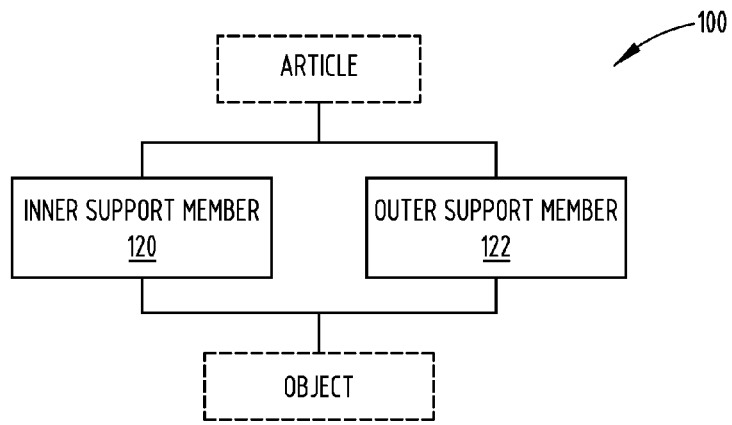
FIG. 1
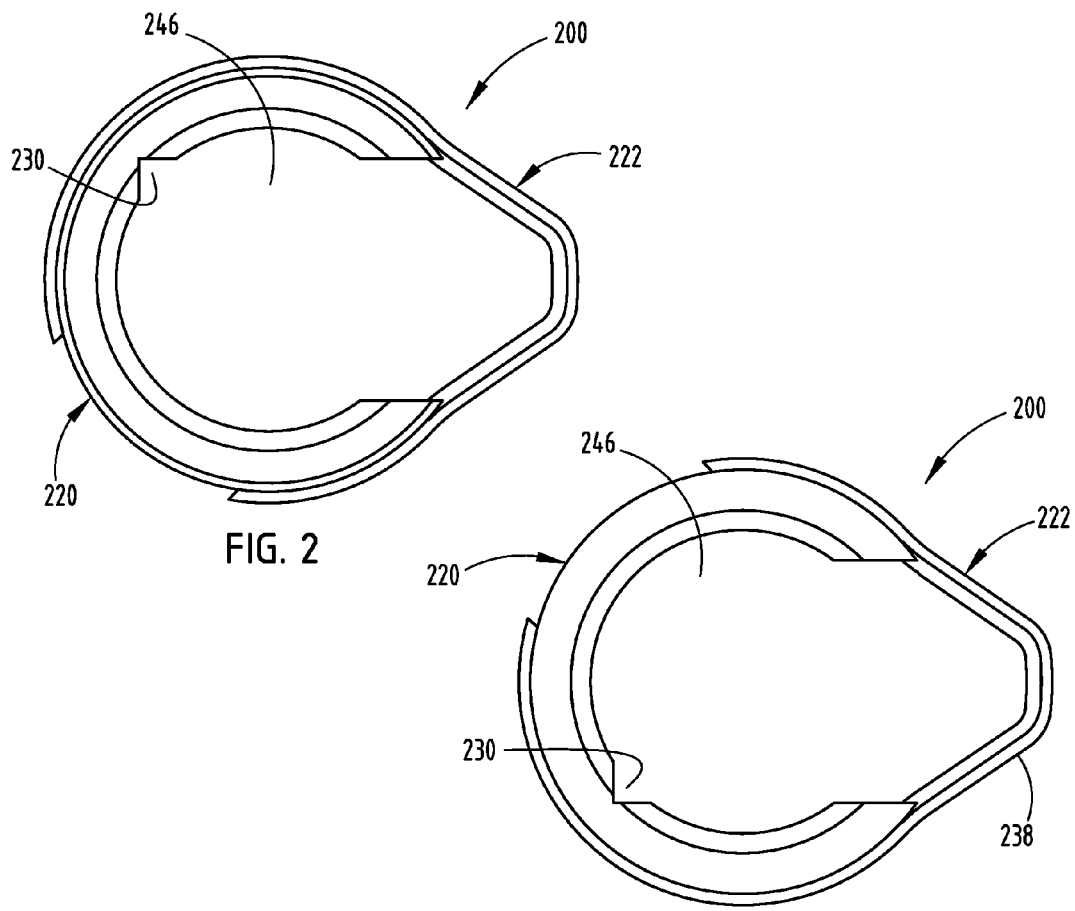
FIG. 2
FIG. 3

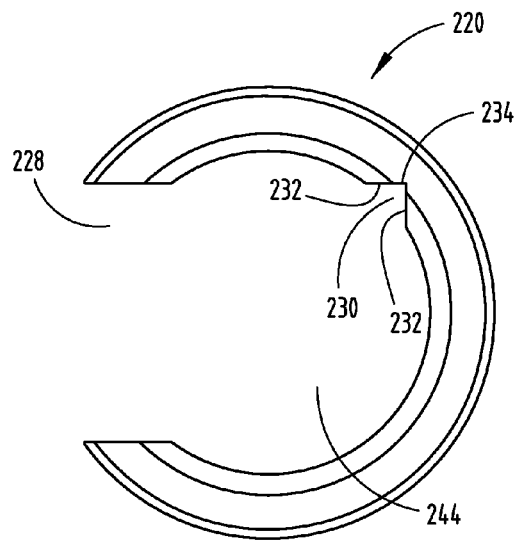 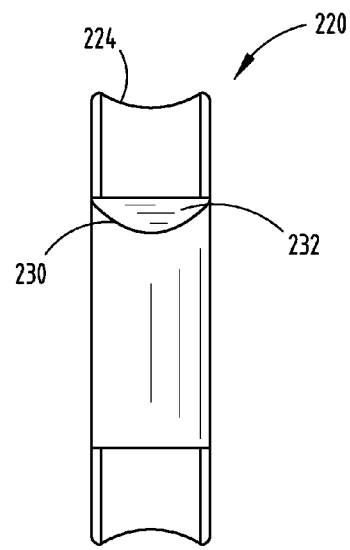
FIG. 10    FIG. 11
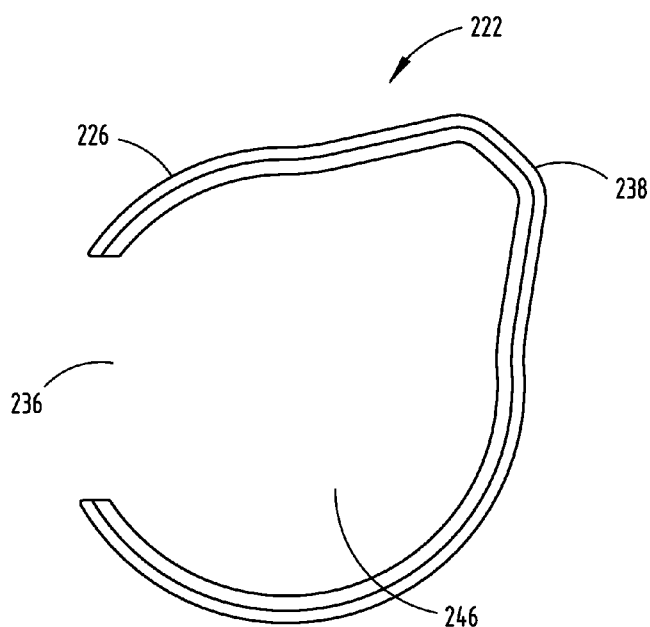 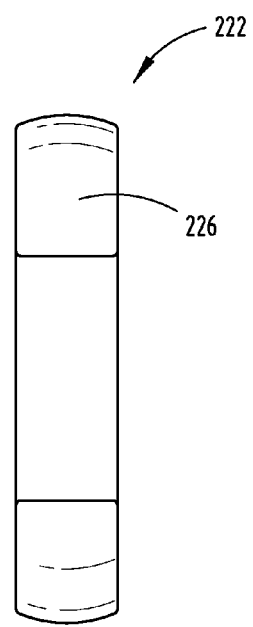
FIG. 12    FIG. 13

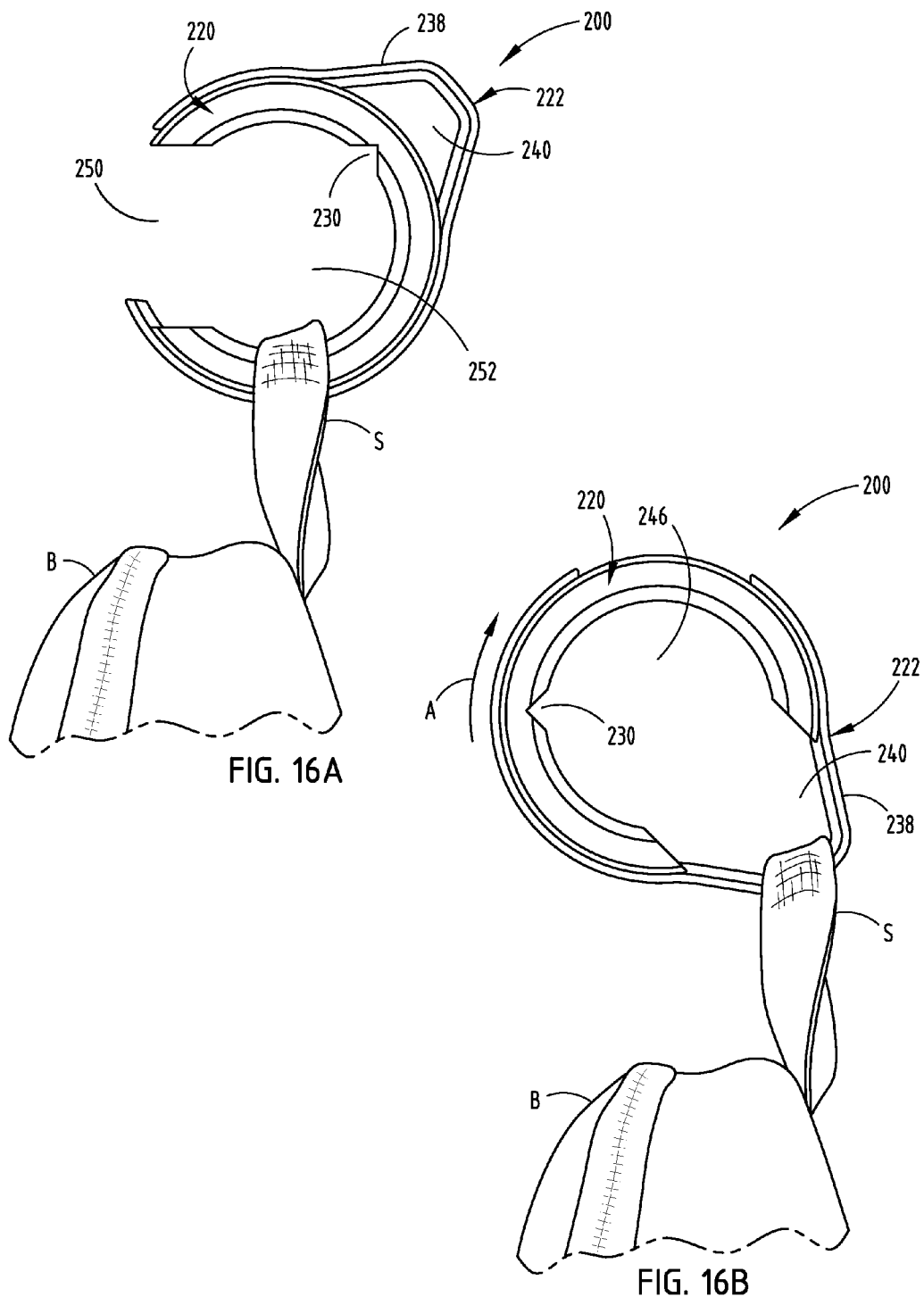

SUPPORT DEVICE FOR SUSPENDING AN ARTICLE FROM A HORIZONTAL OBJECT

BACKGROUND

Some embodiments described herein relate generally to a support device, and more particularly, to a support device that can be used to suspend an article from an object having a substantially horizontal surface.

Some known support devices that can be used to hang or suspend an article from an object, such as an object having a substantially horizontal surface, can be moved between two configurations. For example, in one configuration such support devices can be used to hang an article from an object, such as a desk top, and in a second configuration such devices can, for example, be used as a bracelet or be placed in a configuration to allow the support device to be attached to an article for transport. To achieve the dual configurations, some such support devices for hanging an article from an object may include mechanical hinges or other mechanisms to convert the support device between the two configurations. Such mechanisms may make the support device more difficult to move between configurations, expensive to manufacture, and/or more susceptible to breakage or malfunctions due to the additional components.

Thus, a need exists for an improved support device that can be used to support or suspend an article from an object having a substantially horizontal surface, such as, a desk top, a countertop ledge, a table, a shelf, etc., which can be easily moved between multiple configurations without the need for additional mechanical components.

SUMMARY

Apparatus and methods of use are described herein that can be used to support an article, such as, for example, a purse or backpack, from an object having a substantially horizontal surface, such as, for example, a desk top, countertop ledge, table, or shelf. In some embodiments, an apparatus includes an inner support member having an outer surface and an outer support member rotatably coupled to the inner support member and having an inner surface configured to matingly engage the outer surface of the inner support member. One of the outer surface of the inner support member and the inner surface of the outer support member defines a concave surface and the other defines a convex surface. The outer support member and the inner support member are collectively configured to be releasably coupled to an edge of an object having a substantially horizontal surface. A capture region is defined by at least the outer support and is configured to receive a portion of an article such that the article can be suspended from the object when the inner support member and the outer support member are coupled thereto.

BRIEF DESCRIPTION OF THE FIGURES

FIG. 1 is a schematic illustration of a support device, according to an embodiment, FIG. 2 is a right side view of a support device, according to an embodiment, shown in a first configuration.

FIG. 3 is a left side view of the support device of FIG. 2, shown in the first configuration.

FIG. 10 is a perspective view of an inner support member of the support device of FIG. 2.

FIG. 11 is a front view of the inner support member of FIG. 10.

FIG. 12 is a perspective view of an outer support member of the support device of FIG. 2.

FIG. 13 is a front view of the outer support member of FIG. 12.

FIGS. 16A-16D each illustrate the support device of FIG. 2 in a different configuration and coupled to a backpack during a method of using the support device to couple the backpack to an object having a substantially horizontal surface.

DETAILED DESCRIPTION

Figure 4:
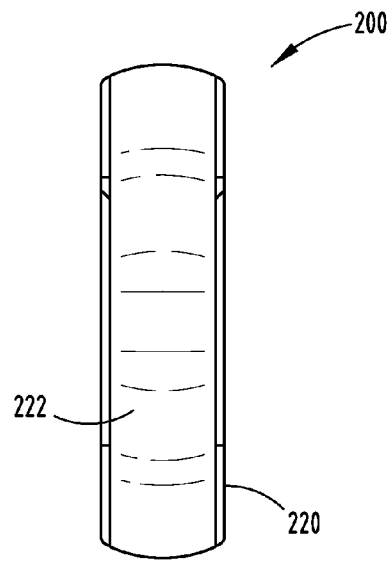
FIG. 4 is a front view of the support device of FIG. 2, shown in the first configuration.
Figure 5:
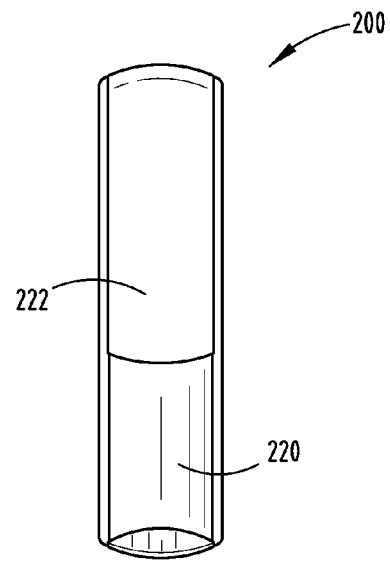
FIG. 5 is a rear view of the support device of FIG. 2, shown in the first configuration.
Figure 6:
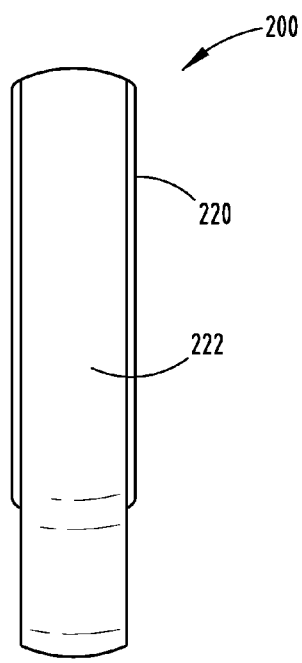
FIG. 6 is a top view of the support device of FIG. 2, shown in the first configuration.
Figure 7:
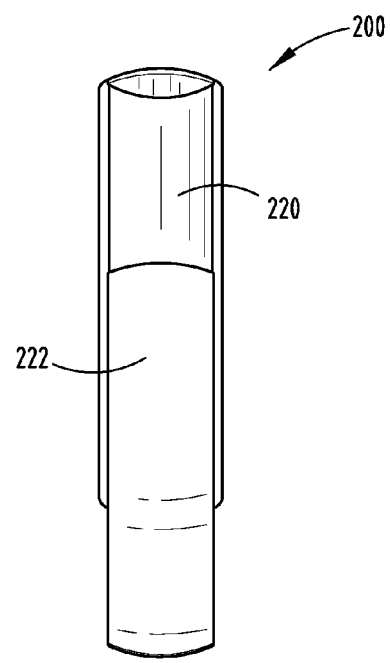
FIG. 7 is a bottom view of the support device of FIG. 2, shown in the first configuration.

Apparatus and methods described herein can be used to support or suspend an article, such as, for example, a purse or backpack, from an object having a substantially horizontal surface, such as for example, a desk, a countertop ledge, a table, a shelf, etc. In some embodiments described herein, a support device includes two concentric support members that are nested together to provide a rotatable coupling between the two support members. The support device can be moved between a first configuration in which a portion of an article, such as, for example, a strap of a purse or backpack (or other strap-type support for an article) can be placed through an annular opening collectively defined by the two support members, and disposed within an interior region defined by the support device. The two support members can then be rotated relative to each other such that the portion of the article (e.g., strap) can be moved to or placed within a capture region of the support device. The two support members can continue to be rotated relative to each other until the two support members again collectively define an annular opening that can be used to mount or couple the support device to an object having a substantially horizontal surface, such as, for example, a desk top, a countertop ledge, a table, or shelf. For example, a portion of a table top can be received through the annular opening such that a portion of one of the support members contacts a top surface of the object and a portion of the other support member contacts a bottom surface of the object. With the support device coupled to the object, the weight of the article can help maintain the support device secured to the object.

In some embodiments, an apparatus includes an inner support member and an outer support member that is rotatably coupled to the inner support member. A capture region is defined by at least the outer support member and is configured to receive a portion of an article. The inner support member and the outer support member are concentric and collectively define an opening configured to receive a portion of an edge of an object having a substantially horizontal surface therethrough such that a portion of the inner support member contacts the object at a first location and a portion of the outer support member contacts the object at a second location to couple the inner support member and the outer support member to the object. The article can be suspended from the object when the portion of the article is disposed within the capture region and the inner support member and the outer support member are coupled to the object.

In some embodiments, an apparatus includes an inner support member and an outer support member rotatably coupled to the inner support member. A capture region is defined by at least the outer support member and is configured to receive a portion of an article. The inner support member and the outer support member collectively have a first configuration in which the inner support member and the outer support member collectively define an opening that is configured to receive an edge of an object having a substantially horizontal surface to couple the inner support member and the outer support member collectively to the edge of the object. The article can be suspended from the object when the portion of the article is disposed within the capture region and the inner support member and the outer support member are coupled to the object. The inner support member and the outer support member have a second configuration in which the inner support member and the outer support member define a closed interior region. The inner support member and the outer support member are concentric in both the first configuration and the second configuration.

As used herein, references to various configurations of a support device can refer to such configurations without respect to a particular order for the configurations. For example, a support device can be moved from a first configuration to a second configuration or from a second configuration to a first configuration. Further, references to various configurations of a support device described herein can also refer to various configurations of the inner support member and the outer support member. For example, the inner support member and the outer support member can collectively have various configurations, and such configurations can also refer to configurations of the support device.

FIG. 1 illustrates a support device according to an embodiment. A support device 100 includes an inner support member 120 and an outer support member 122 that are rotatably coupled to each other. The inner support member 120 and the outer support member 122 can be moved or rotated relative to each other, to move the support device 100 between various configurations. For example, the inner support member 120 can be rotated relative to the outer support member 122, the outer support member 122 can be rotated relative to the inner support member 120, or both the inner support member 120 and the outer support member 122 can be rotated relative to each other. The support device 100 can be moved between, for example, a closed or transport configuration and an open or use configuration in which the support device 100 can be used to support or suspend an article. For example, the support device 100 can be used to suspend an article, such as, for example, a purse or backpack, from an object having a substantially horizontal surface, such as, for example, an edge of a desk top, countertop ledge, table, or shelf. The transport configuration can include configurations that allow the support device 100 to be coupled to a strap or other strap-type support of an article, or to be worn as a bracelet by a user. For example, in the transport configuration, the support device 100 may be coupled to the exterior of a backpack or to a bike. While in the transport configuration, the support device 100 may also be used to couple or secure additional items, such as a water bottle, or set of keys, to the exterior of the backpack or bike. In the transport configuration, the support device 100 may also be coupled to a particular interior portion of a bag, which can allow a user to locate the support device 100 more quickly.

The inner support member 120 and the outer support 122 can be radially and concentrically disposed relative to each other. In some embodiments, the inner support member 120 and the outer support member 122 are concentric in both a closed or transport configuration and an open or use configuration. In some embodiments, the inner support member 120 can include an outer surface that matingly and slidably engages an inner surface of the outer support member 122. In some embodiments, the inner support member 120 includes a concave outer surface and the outer support member 122 includes a convex inner surface that matingly engages the concave outer surface of the inner support member 120. In alternative embodiments, the outer surface of the inner support member 120 can be convex and the inner surface of the outer support member 122 can be concave. In some embodiments, the inner support member 120 or the outer support member 122 can include a flange or flanges that can help maintain the other of the inner support member 120 and the outer support member 122 coupled together. For example, one of the inner support member 120 or the outer support member 122 can define a track in which the other can slide. The mating surfaces of the inner support member 120 and the outer support member 122 can allow the inner support member 120 and the outer support member 122 to rotatably and slidably move relative to each other.

Each of the inner support member 120 and the outer support member 122 define an annular opening (not shown in FIG. 1) that can be used to couple an article to the support device 100 and/or to couple the support device 100 to a portion of an edge of an object having a substantially horizontal surface, such as, for example, an edge of a desk top, table top, countertop ledge, or shelf, as described in more detail below. The outer support member 122 also includes a protruding portion (not shown in FIG. 1) that extends radially outward at an annular location on the outer support member 122. The protruding portion can define, at least in part, a capture region to receive and hold a portion of an article, such as, for example, a strap of a purse or backpack, as described in more detail below. In some embodiments, the capture region can be defined entirely by the outer support member 122. In some embodiments, the capture region can be defined collectively by the inner support member 120 and the outer support member 122.

The inner support member 120 can include an engaging portion (not shown in FIG. 1) that can be used to help maintain the support device 120 coupled to an edge of an object having a substantially horizontal surface, such as an edge of a desk top, table top, countertop or shelf. In some embodiments, the engaging portion can be for example, a notch defined in the inner surface of the inner support member. In some embodiments, the engaging portion can include a substantially planar surface configured to at least partially contact a top surface of the object to which the support device 100 is to be coupled.

As described above, the inner support member 120 and the outer support member 122 can be rotated relative to each other to move the support device between different configurations. For example, the support member 100 (i.e., the inner support member 120 and the outer support member 122) can be moved to a first or closed configuration in which the annular openings defined by the inner support member 120 and the outer support member 122 are misaligned and the inner support member 120 and the outer support member 122 define a closed interior region. In this configuration, the support device 100 can be, for example, coupled to an article, or worn as a bracelet for transport. The inner support member 120 and the outer support member 122 can be moved to a second or open configuration in which the annular opening on the inner support member 120 and the annular opening on the outer support member 122 are at least partially aligned and collectively define a first receiving region or opening. The first receiving region can be used to receive therethrough a portion of an article, such as, for example, a strap of a backpack or purse. The inner support member 120 and/or the outer support member 122 can be rotated again until their respective annular openings are again misaligned and the support device 100 is in the closed configuration. In some embodiments, as the inner support member and the outer support member are rotated, the strap of the backpack can be positioned within the capture region (not shown in FIG. 1), as described in more detail below with reference to specific embodiments. In some embodiments, as the inner support member 120 and/or the outer support member 122 are rotated, a portion of the inner support member 120 can move the strap to within the capture region. The inner support member 120 and/or the outer support member 122 can continue to be rotated until the respective annular openings are again at least partially aligned and define a second receiving region or opening, and the support device 100 is in an open configuration. The second receiving region can be used to couple the support device 100 to an edge of an object having a substantially horizontal surface (e.g., an edge of a table top of desk top) such that the article (e.g., backpack) can be suspended from the object as described in more detail below.

In certain embodiments, the inner support member 120 and outer support member 122 can each be made of one or more various materials including, for example, metals, alloys, plastics, wood, or any material capable of achieving sufficient rigidity to support an article. The inner support member 120 may be made of the same or different material or materials as the outer support member 122.

FIGS. 2-9 illustrate a support device, according to an embodiment. A support device 200 includes an inner support member 220 and an outer support member 222 that are rotatably coupled to each other. As shown for example, in FIGS. 2, 3 and 9, the inner support member 220 and the outer support member 222 are concentric and radially disposed relative to each other. The inner support member 220 includes an outer surface that matingly and slidably engages an inner surface of the outer support member 222. As described above for support device 100, the inner support member 220 and the outer support member 222 can be moved or rotated relative to each other such that the support device 200 (and collectively the inner support member 220 and outer support member 222) can be moved between various configurations for transport and use of the support device 200. For example, the support device 200 can be used to support or suspend an article, such as, for example, a purse or back pack, from an object having a substantially horizontal surface, such as, for example, an edge of a table or desk top, as described above for support device 100.

In each of the configurations described herein (e.g., open and closed configurations) the inner support member 220 and the outer support member 222 remain concentric. The nested and concentric coupling of the inner support member 220 and the outer support member 222 allow the support device 200 to be easily moved between its various configurations by simply rotating the inner support member 220 and/or the outer support member, without the use of additional mechanisms or mechanical components.

In this embodiment, the inner support member 220 includes a concave outer surface 224 (see, e.g., FIGS. 10 and 11) and the outer support member 222 includes a convex inner surface 226 (see, e.g., FIGS. 12 and 13) that matingly engages the concave outer surface 224 of the inner support member 220. The mating surfaces 224 and 226 allow the inner support member 220 and the outer support member 222 to rotatably and slidably move relative to each other.

In this embodiment, the inner support member 220 defines an annular opening 228 and an engaging portion that includes a notch 230. The annular opening 228 is in communication with an interior region 242 defined by the inner support member 220, as shown, for example, in FIGS. 10 and 11. The notch 230 can be defined by surfaces 232 of the inner support member 222 that meet at a base 234. The notch 230 can be used to help secure the support device 200 to an object having a substantially horizontal surface. For example, the notch 230 can engage a corner of an edge of the object, as described in more detail below. To accommodate different types of edge shapes and sizes, the notch 230 can have various different shapes and sizes. For example, the surfaces 232 can be angled as shown, for example, in FIG. 10, or can alternatively be radiused. The size of the angle or radius of the surfaces 232 can also be varied. The base 234 can be, for example, a substantially angled corner where the surfaces 232 meet, or a flat region, or a radiused region.

As shown, for example, in FIGS. 12 and 13, the outer support member 222 defines an annular opening 236 in communication with an interior region 244 defined by the outer support member 222. The outer support member 222 also includes a protruding portion 238 that extends radially outward at an annular location on the outer support member 222. The protruding portion 238 defines a portion of the interior region 244.

As described above, the inner support member 220 and the outer support member 222 can be rotated relative to each other to move the support device 200 between different configurations. For example, the inner support member 220 can be rotated relative to the outer support member 222, the outer support member 222 can be rotated relative to the inner support member 220, or both the inner support member 220 and the outer support member 222 can be rotated relative to each other. In one example, the inner support member 220 and the outer support member 222 can have a first or closed configuration in which the annular openings 228 and 236 defined by the inner support member 220 and the outer support member 222, respectively, are misaligned and the inner support member 220 and the outer support member 222 collectively define a closed interior region 246, as shown, for example, in FIGS. 2 and 3.

Figure 14:
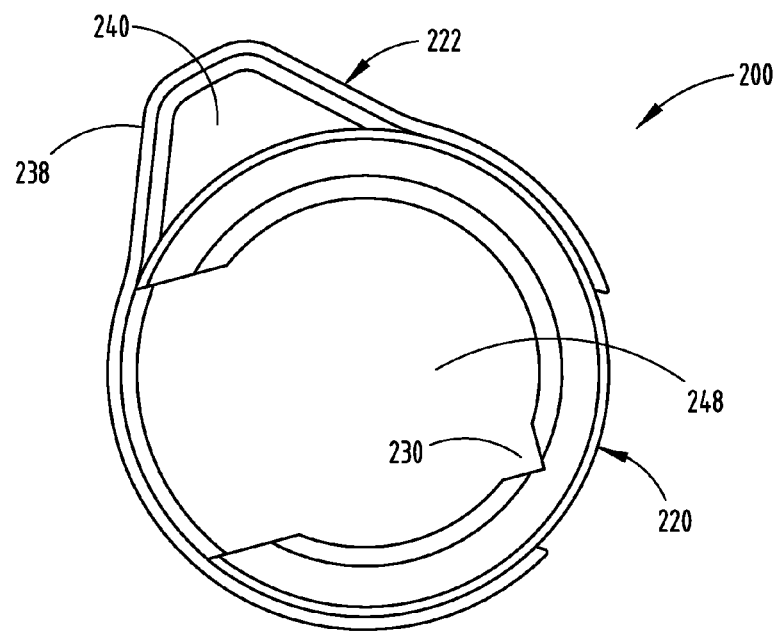
FIG. 14 is a side view of the support device of FIG. 2 shown in a third configuration.

The inner support member 220 and/or the outer support member 222 can be rotated to move the support device 200 (i.e., the inner support member 220 and the outer support member 222) to a second closed configuration in which the opening 228 on the inner support member 220 and the opening 236 on the outer support member 222 are still misaligned and the inner support member 220 and the outer support member 222 collectively define a closed interior region 248 and a capture region 240, as shown, for example, in FIG. 14. Thus, in this embodiment, the capture region 240 is defined by the protruding portion 238 of the outer support member 222 and the inner support member 220. The capture region 240 can be used to hold or trap a portion of an article (e.g., a strap of a purse or backpack), as described in more detail below. The protruding portion 238 and the capture region 240 can have various alternative shapes and sizes to accommodate different sizes of articles to be supported (e.g., different strap sizes).

Figure 8:
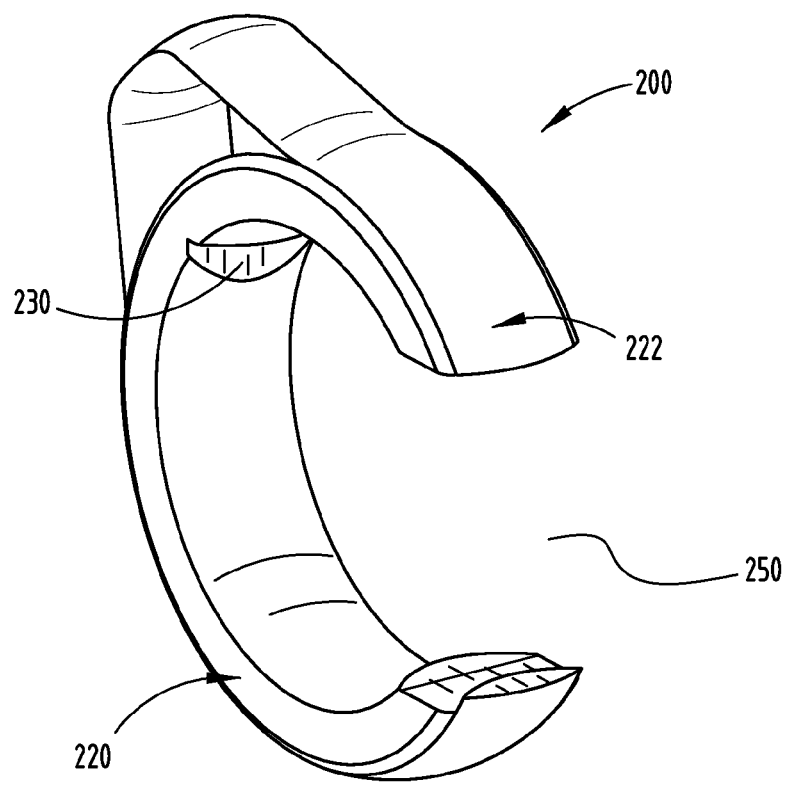
FIG. 8 is a perspective view of the support device of FIG. 2, shown in a second configuration.
Figure 9:
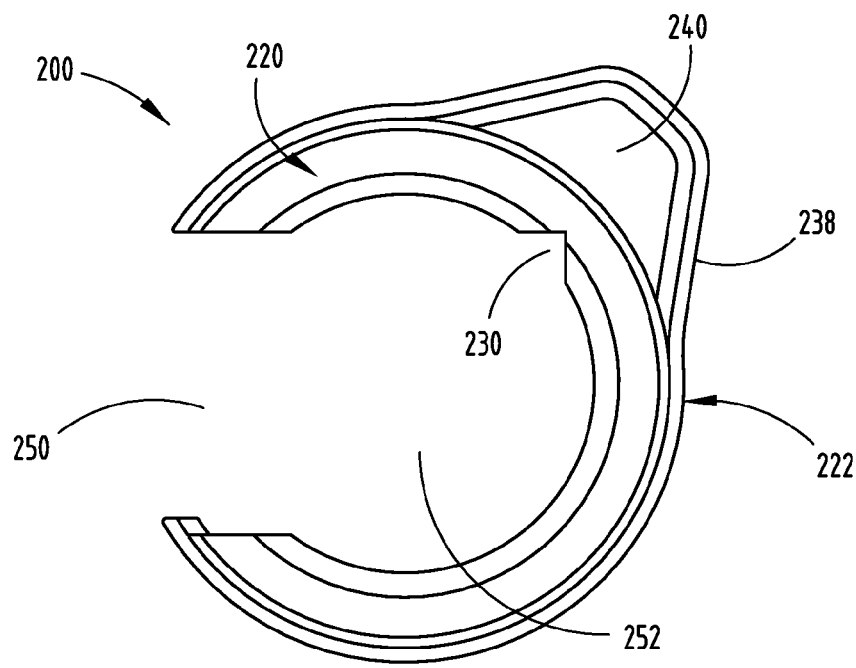
FIG. 9 is a side view of the support device of FIG. 2, shown in the second configuration.

The inner support member 220 and the outer support member 222 can continue to be rotated to a third or open configuration in which the respective openings 228 and 236 are at least partially aligned and collectively define a receiving region or opening 250 in communication with an interior region 252, as shown for example, in FIGS. 8 and 9. The interior region 252 can be defined by the inner support member 220, or collectively defined by the inner support member 220 and the outer support member 222, depending on the amount of misalignment, if any, between the opening 228 of the inner support member 220 and the opening 236 of the outer support member 222.

Figure 15:
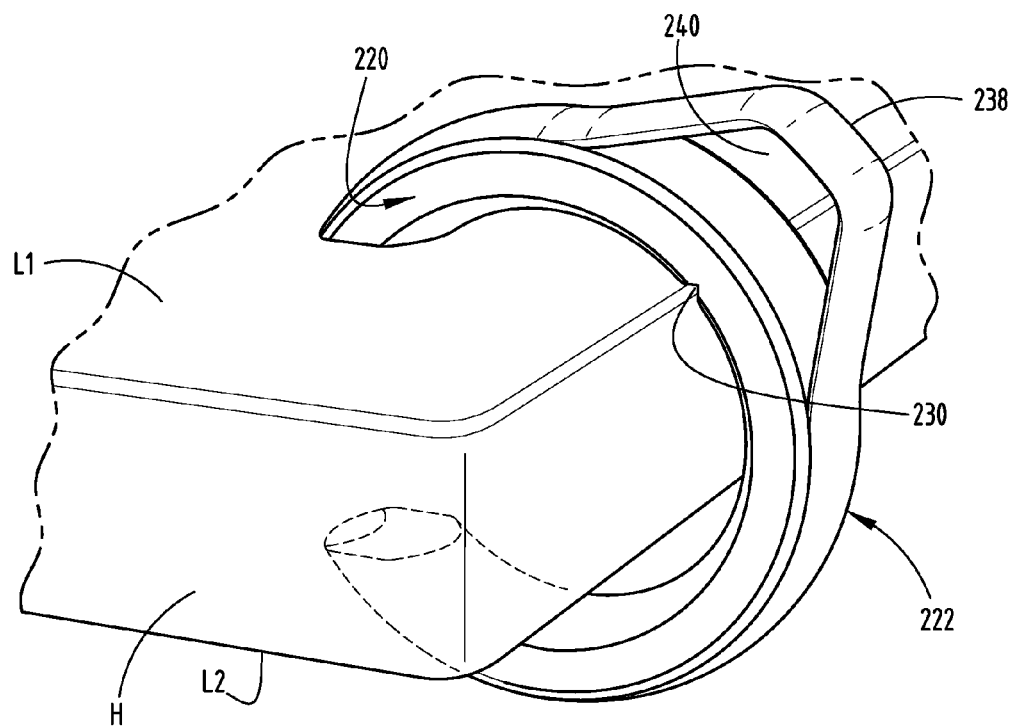
FIG. 15 is a side view of the support device of FIG. 2 shown coupled to a portion of an edge of an object having a substantially horizontal surface.

The receiving region 250 can be used to receive therethrough a portion of an article, such as, for example, a portion of a strap of a backpack. The inner support member 220 and the outer support member 222 can continue to be rotated until their respective annular openings 228 and 236 are again misaligned and such that the a portion of the article (e.g., the strap of a backpack) is moved to or can be positioned within the capture region 240 as described in more detail below with respect to FIGS. 16A-16D. The inner support member 220 and/or the outer support member 222 can continue to be rotated until the openings 228 and 236 are again at least partially aligned and collectively define the receiving region or opening 250, as shown for example, in FIGS. 8 and 9. The receiving region 250 can be used to couple the support device 200 to an object having a substantially horizontal surface, as shown, for example, in FIG. 15 (FIG. 15 is shown without an article coupled thereto). The receiving region or opening 250 can vary in size depending on the amount of alignment or misalignment between the opening 228 and the opening 236. For example, the receiving region or opening 250 can be a first size when a portion of an article (e.g., strap of a backpack) is placed therethrough, as described above, and a second size when the receiving region or opening 250 is used to couple the support device 220 to the object. The first size of the receiving region 250 can be the same or different than the second size of the receiving region 250. In addition, both the opening 228 and the opening 236 can be various different sizes to accommodate different sized articles and/or different sized objects to which the support device 200 is to be coupled. Thus, as the openings 228 and 236 vary, the size of the receiving region 250 can also vary.

When coupled to the edge of an object having a substantially horizontal surface, at least a portion of the notch 230 of the inner support member 220 can engage a corner of the object H, as shown in FIG. 15. In addition, a portion of the inner support member 220 or a portion of the outer support member 222 can contact the top surface of the object at a first contact location L1, and a portion of the inner support member 220 or a portion of the outer support member 222 can contact the bottom surface of the object at a second contact location L2. When an article is coupled to the support device 200 (as described above) and the support device 200 is coupled to the object, the article can be suspended from the object and the downward force exerted by the weight of the article can cause the inner support member 220 and/or the outer support member 222 to grab or clamp the object (e.g., at the contact locations between the inner support member 220 and outer support member 222, and the object) and help maintain the support device 200 coupled to the object.

Figures 16C, 16D:
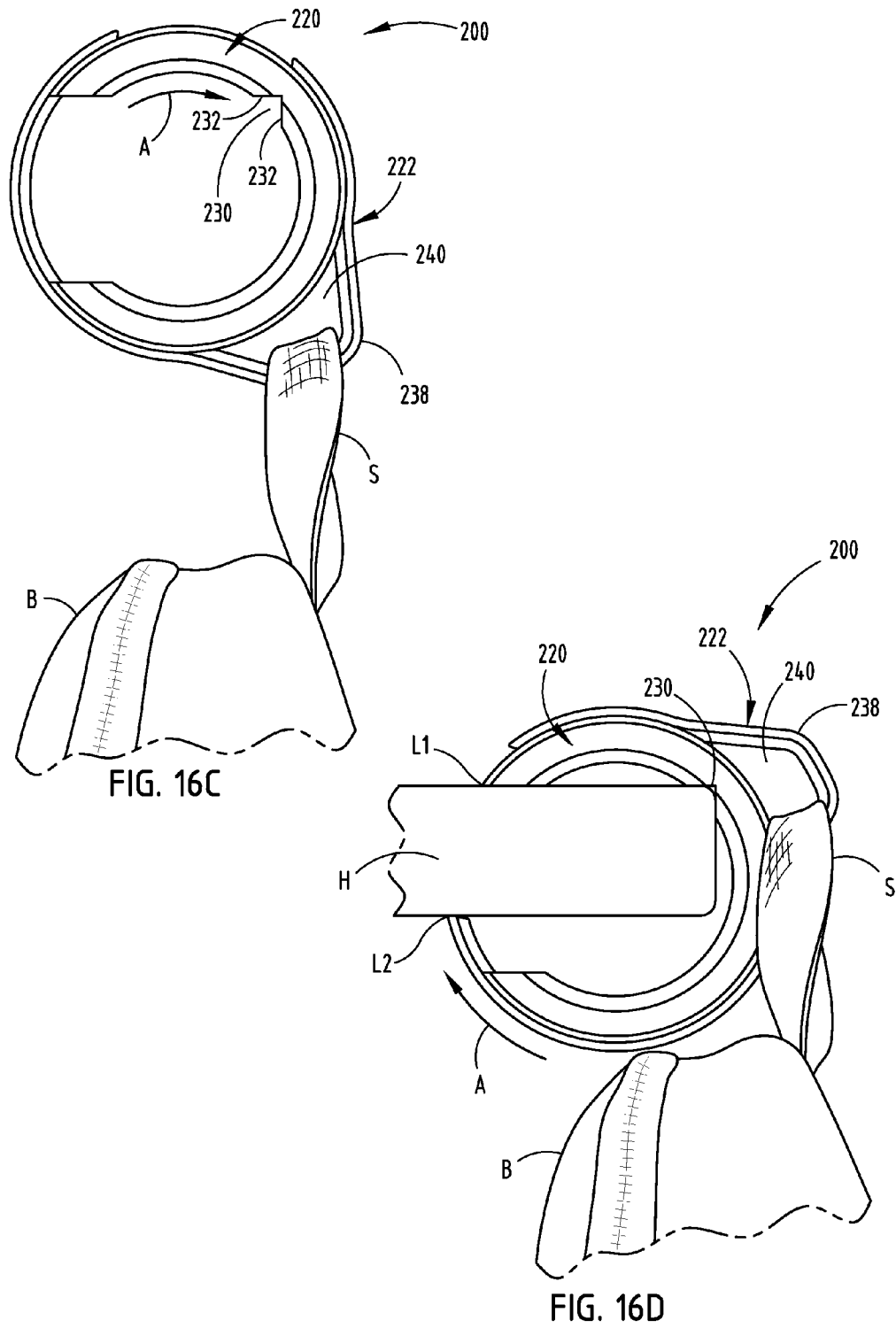

FIGS. 16A-16D illustrate an example method of coupling a strap of a backpack to the support device 200 and coupling the support device 200 to an edge portion of an object having a substantially horizontal surface. As shown in FIG. 16A, the support device 200 (i.e., the inner support member 220 and the outer support member 222) is in an open configuration as described above (e.g., with respect to FIGS. 8 and 9) such that a strap S of a backpack B can be placed through the receiving region or opening 250 and within the interior region 252. As shown in FIG. 16B, the inner support member 220 can be rotated in the direction of arrow A such that the support device 200 is in a closed configuration that defines an interior region 246. The strap S can then be positioned within the portion of the interior region 246 defined by the protruding portion 238. The inner support member 220 can continue to be rotated in the direction of arrow A such that the strap S is trapped within the capture region 240 defined by the inner support member 220 and the protruding portion 238, as shown in FIG. 16C.

The inner support member 220 can continue to be rotated until the opening 228 of the inner support member 220 and the opening 236 of the outer support member 222 are at least partially aligned (as shown in FIG. 16A) to place the support device 200 in an open or use configuration. As described above, in this configuration, the support device 200 can be coupled to an object having a substantially horizontal surface H, as shown in FIG. 16D, to suspend the back pack from the object H. For example, the edge of the object H can be received through the receiving region or opening 250 and the notch 230 of the inner support member 220 can engage a corner of the object H. The weight of the backpack B can exert a force on a bottom portion of the protruding portion 238 and urge the outer support member 222 against a bottom surface of the object H at a first contact location, and the inner support member 220 will be urged against a top surface of the object H at a second contact location L2. Thus, the weight of the backpack B suspended from the object H helps maintain the support device 200 coupled to the object H. In some cases, after being coupled to the object, the outer support member 222 can be rotated slightly in the direction of arrow A to ensure contact between the outer support member 222 and the bottom surface of the object.

Figure 17A:
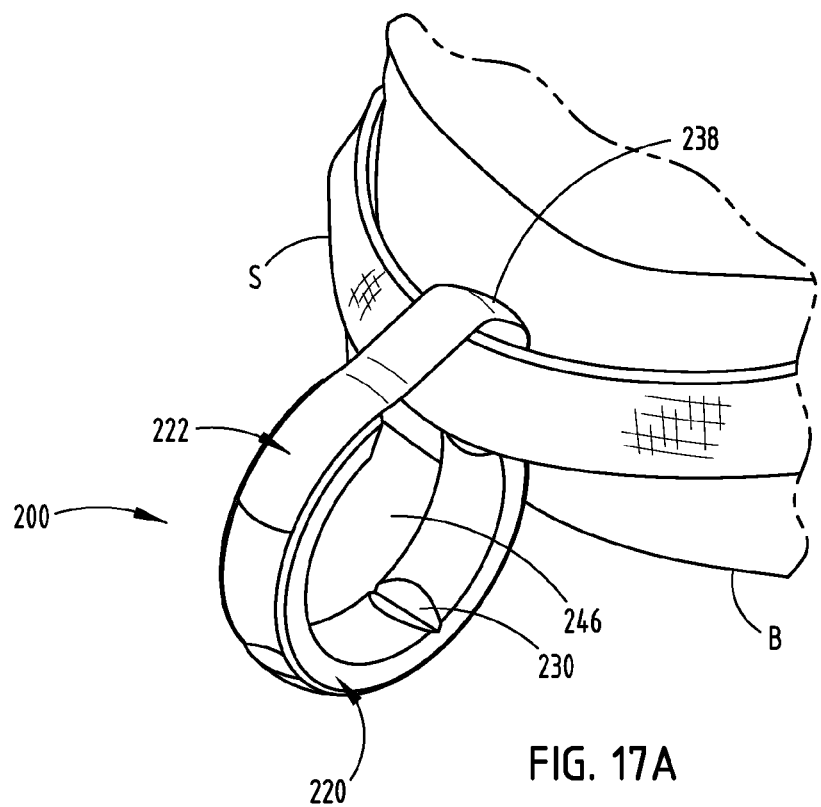
FIGS. 17A and 17B each illustrate the support device of FIG. 2 shown in a different configuration and coupled to a strap of a backpack.
Figure 17B:
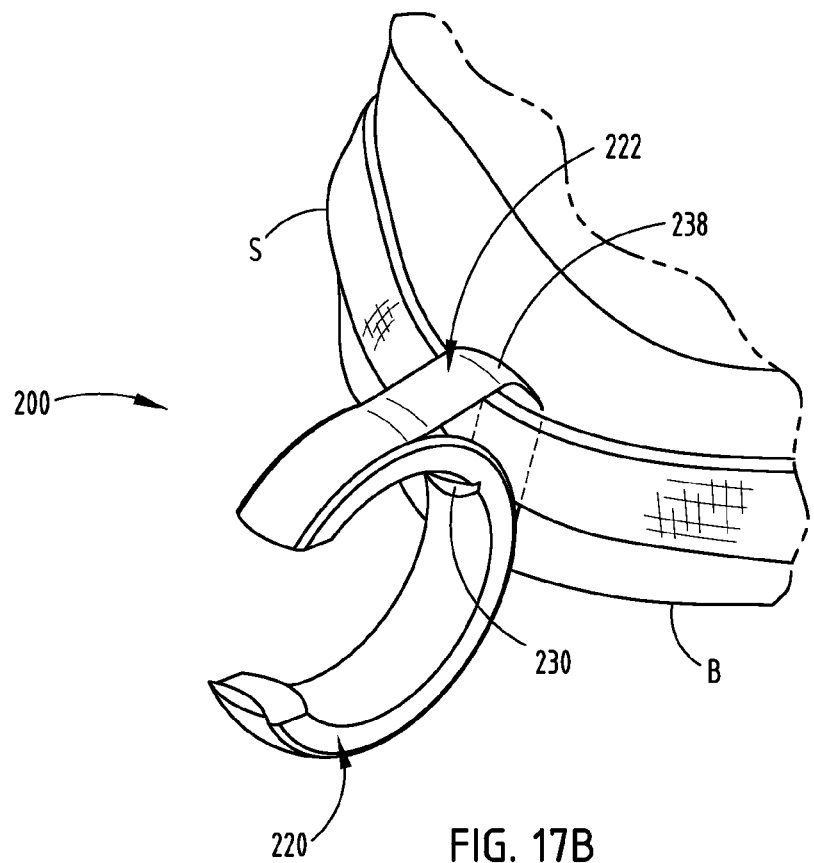

FIGS. 17A and 17B each illustrate the support device 200 coupled to a strap of a backpack. FIG. 17A illustrates the support device 200 in a transport or closed configuration as described above, for example, with reference to FIGS. 2 and 3. The support device 200 can be placed in an open configuration as described above, for example, with reference to FIGS. 8 and 9, to place the strap S within the interior region of the support device 200. The support device 200 can be moved to the transport or closed configuration by rotating the inner support member 220 and/or the outer support member 222 such that the support device 200 is placed in a closed configuration while coupled to the strap S. In this configuration, the support device 200 can alternatively be worn as a bracelet by a user. FIG. 17B illustrates the support device 200 moved back to an open configuration while coupled to the strap S. In this configuration, the support device 200 can be coupled to an object having a substantially horizontal surface as described above.

Figure 18:
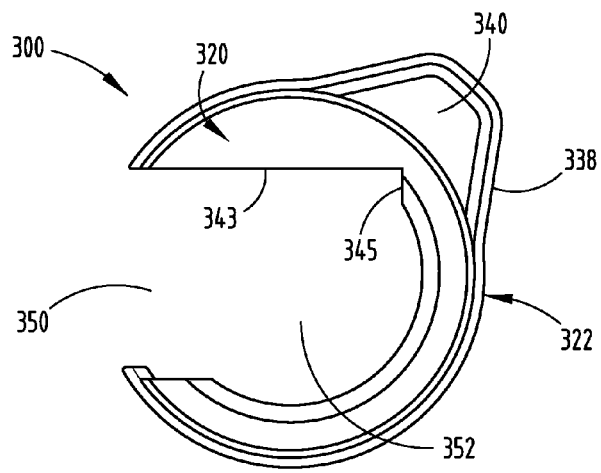
FIGS. 18-20 are each a side view of a different embodiment of a support device.
Figure 19:
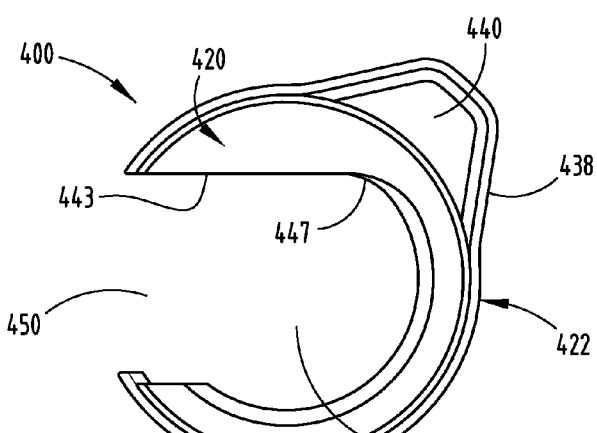
Figure 20:
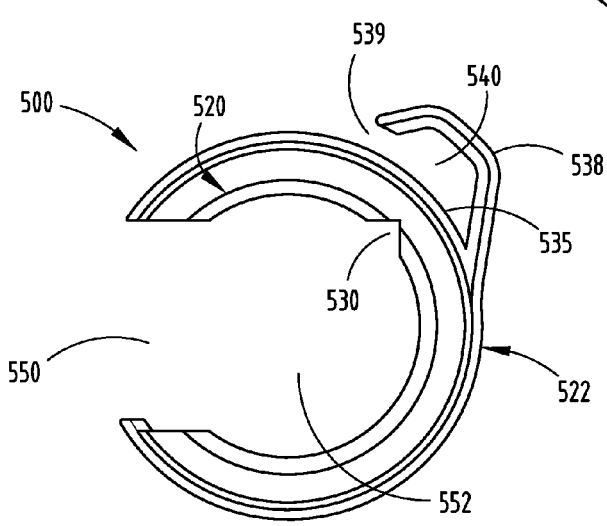

FIGS. 18-20 are each a side view of an embodiment of a support device according to different embodiments. A support device 300 is shown in FIG. 18, a support device 400 is shown in FIG. 19 and a support device 500 is shown I FIG. 20. Each of the support devices 300, 400 and 500, shown in FIGS. 18-20, respectively, include an inner support member and an outer support member that are rotatably coupled to each other. The support devices 300, 400 and 500 can each be used in the same or similar manner as described above for support devices 100 and 200 to support or suspend an article, such as, for example, a purse or back pack, from an object having a substantially horizontal surface. For example, the inner support members and the outer support members of each of the support devices 300, 400 and 500 can be moved or rotated relative to each other such that the support devices 300, 400 and 500 can be moved between various configurations for transport and use of the support device 300, 400 and 500. In each of the support members 300, 400 and 500, the inner support member and the outer support member can be concentric and radially disposed relative to each other while moved between the various configurations.

As shown in FIG. 18, the support device 300 includes an inner support member 320 and an outer support member 322 and is shown in an open configuration in which respective annular openings of the inner support member 320 and the outer support member 322 are at least partially aligned and define a receiving region or opening 350 in communication with an interior region 352. The outer support member 322 can include the same or similar features as described above for outer support member 222. For example, the outer support member 322 includes a protruding portion 338 that at least partially defines a capture region 340, and includes a convex inner surface configured to matingly engage a concave outer surface of the inner support member 320.

In this embodiment, the inner support member 320 includes an engaging portion that includes a substantially planar first portion 343 and a second portion 345 that is disposed transverse to the first portion 343. The first portion 343 of the engaging portion is configured to contact a top surface of an object to which the support device 300 is coupled, and the second portion 345 of the engaging portion is configured to contact a front surface of the object. The engaging portion can be used to help secure the support device 300 to the object in a similar manner as described above for notch 230.

As shown in FIG. 19, the support device 400 includes an inner support member 420 and an outer support member 422 and is shown in an open configuration in which respective annular openings of the inner support member 420 and the outer support member 422 are at least partially aligned and define a receiving region or opening 450 in communication with an interior region 452. The outer support member 422 can include the same or similar features as described above for outer support member 222. For example, the outer support member 422 includes a protruding portion 438 that at least partially defines a capture region 440, and includes a convex inner surface configured to matingly engage a concave outer surface of the inner support member 420.

In this embodiment, the inner support member 420 includes an engaging portion that includes a substantially planar first portion 443 and a second portion 447 that is curved or radiused. The first portion 443 of the engaging portion is configured to contact a top surface of an object to which the support device 400 is coupled, and the second portion 447 of the engaging portion is configured to at least partially contact a front surface of the object. The engaging portion can be used to help secure the support device 400 to the object in a similar manner as described above for notch 230.

As shown in FIG. 20, the support device 500 includes an inner support member 520 and an outer support member 522 and is shown in an open configuration in which respective annular openings of the inner support member 520 and the outer support member 522 are at least partially aligned and define a receiving region or opening 550 in communication with an interior region 552. In this embodiment, the inner support member 520 can include the same or similar features as described above for inner support member 220. For example, the inner support member 520 includes an engaging portion in the form of a notch 530 that is the same as or similar to the notch 230 described above. The inner support member 520 also includes a concave outer surface configured to matingly engage a convex inner surface of the outer support member 522.

In this embodiment, the outer support member 522 includes a protruding portion 538 that collectively with a portion 535 of the outer support member 522 defines a capture region 540. The protruding portion 538 and the portion 535 also collectively define an opening 539 in communication with the capture region 540 through which a portion of an article, such as a strap, can be inserted. Thus, in this embodiment, the protruding portion 538 does not define a portion of an interior region of the outer support member 522 as described above, for example, with respect to protruding portion 238 and outer support member 222 (see also, e.g., FIG. 12), and the capture region 540 is defined by the outer support member 522 alone.

Figure 21A:
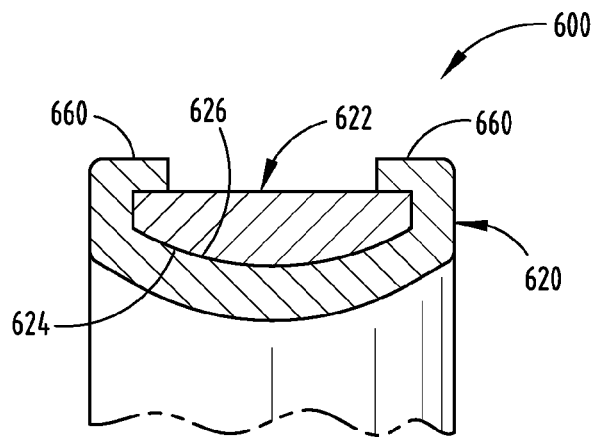
FIGS. 21A-21C are each a cross-sectional view of a portion of a different embodiment of a support device.
Figure 21B:
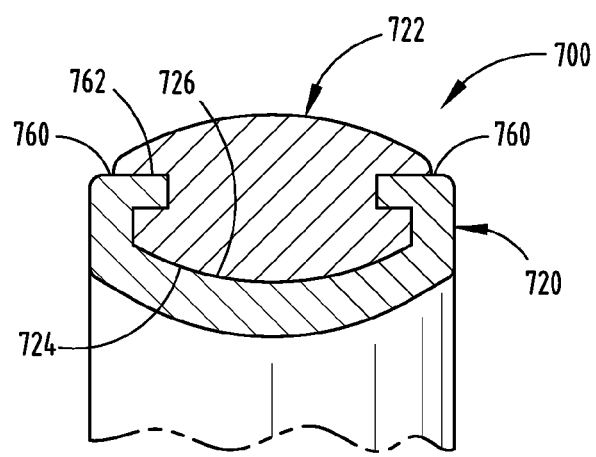
Figure 21C:
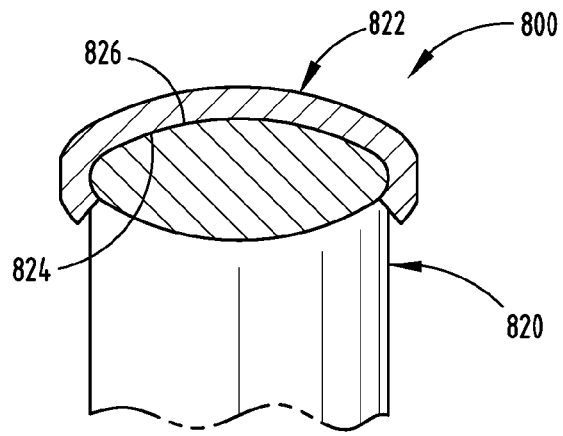

FIGS. 21A-21C each illustrate a cross-section of a portion of a different alternative embodiment of a support device. Each of the embodiments of FIGS. 21A-21C can be moved between various configurations and can be used in the same or similar manner as described above for previous embodiments. Each of the embodiments of FIGS. 21A-21C can also include the same or similar features as described above for previous embodiments. FIG. 21A illustrates a support device 600 that includes an inner support member 620 and an outer support member 622. The inner support member includes flanges 660 and a convex inner surface 624. The outer support member 622 includes a concave outer surface 726 and is slidably and rotatably coupled to the inner support member 620. The flanges 660 of the inner support member 620 can help maintain the outer support member 622 coupled to the inner support member 620.

FIG. 21B illustrates a support device 700 that includes an inner support member 720 and an outer support member 722. The inner support member includes a convex outer surface 724 and flanges 760. The outer support member 722 includes a concave inner surface 726 and defines cutouts 762 that can slidably and matingly receive the flanges 760. The interlocking flanges 760 and cutouts 762 can help maintain the inner support member 720 coupled to the outer support member 722 during use. Such interlocking between the inner support member 720 and the outer support member 722 can also provide a narrower window of rotation to connect the two components together. For example, the flanges 760 can define an opening or keyway through which the outer support member 722 can be placed such that the outer support member 722 can then be slidably rotated relative to the inner support member 720. In alternative embodiments, other interlocking or keying features can be included to help maintain the inner support member and the outer support member coupled together and to provide for an insertion location to connect the inner support member to the outer support member.

FIG. 21C illustrates a support device 800 that includes an inner support member 820 that includes a convex outer surface 824 and an outer support member 822 that includes a concave inner surface 826 that matingly engages the convex outer surface 824 of the inner support member 820. The outer support member 822 includes protrusions or lip portions 864 that can help maintain the inner support member 820 coupled to the outer support member 822. In alternative embodiments, the support device 800 can include flanges or flanges and cut-outs as described above for FIGS. 21A and 21B. In addition, the support device 800 and/or the support device 600 can each include interlocking features, such as, for example, a keyway as described above for support device 700.

Figure 22:
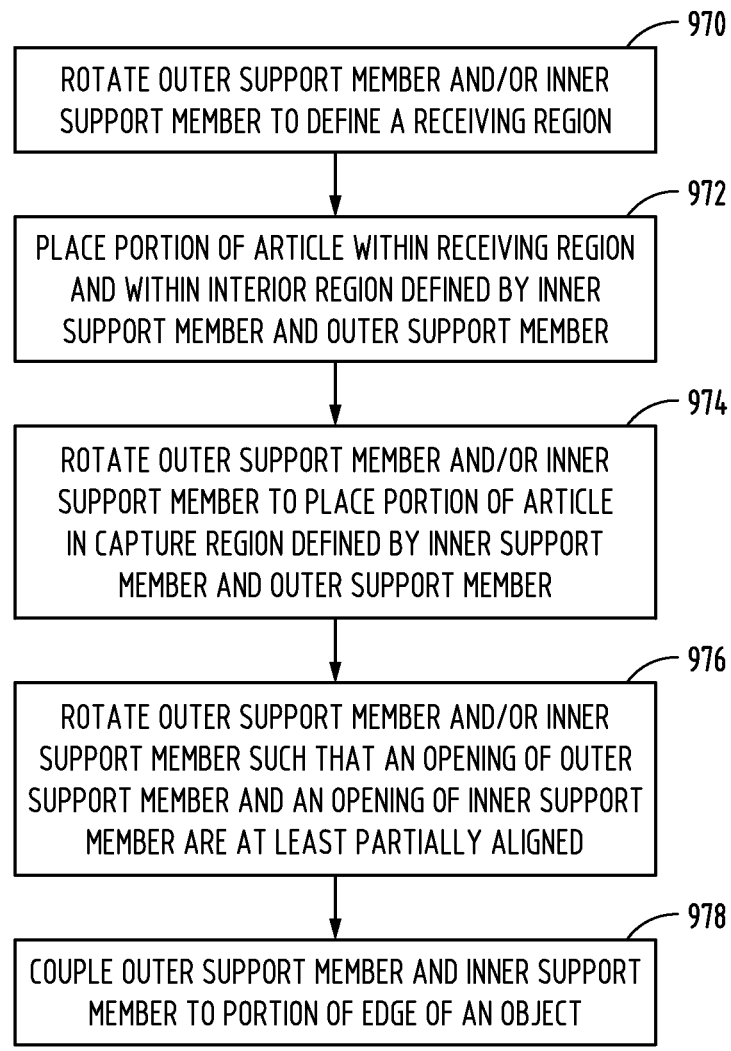
FIG. 22 is a flowchart illustrating a method of using the support device to suspend an article from an object having a substantially horizontal surface.

FIG. 22 is a flowchart illustrating a method of using a support device described herein. The method includes at 970, rotating an outer support member and/or an inner support member of a support device (e.g., support device 100, 200, 300, 400, 500, 600, 700, or 800) relative to the other such that an opening defined by the inner support member and an opening defined by the outer support member are at least partially aligned and define a first receiving region. At 972, a portion of an article can be placed within the first receiving region. For example, a strap of a backpack or purse can be placed through the first receiving region and within an interior region defined by the inner support member and the outer support member. At 974, after placing the portion of the article through the first receiving region, at least one of the inner support member or the outer support member can be rotated relative to the other such that the portion of the article is moved or positioned within a capture region collectively defined by the inner support member and the outer support member. At 976, after moving the portion of the article to the capture region, at least one of the inner support member or the outer support member can be rotated relative to the other such that the opening of the inner support member and the opening of the outer support member are at least partially aligned and define a second receiving region. At 978, the inner support member and the outer support member can be collectively coupled to an edge of an object having a substantially horizontal surface, such as an edge of a desk top, table top, countertop, shelf, etc., such that the edge is disposed within the second receiving region and the article is suspended from the object.

While various embodiments have been described above, it should be understood that they been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except combinations and/or sub-combinations of the functions, components and/or features of the different embodiments.

For example, although the support devices described herein are shown as having a particular size, the size of the support device can vary to accommodate different sized articles and/or different sized horizontal objects. Similarly, the protruding portion of the outer support member can be various different shapes and sizes, and therefore the capture region, which is defined in part by the protruding portion, can be various different shapes and/or sizes. In addition, although the support devices are shown in some figures as being used to support a backpack, it should be understood that the support devices described herein can be used to support and suspend other types of articles.

What is claimed is:

1. An apparatus, comprising:
   an inner support member having an outer surface; and
   an outer support member rotatably coupled to the inner support member and having an inner surface configured to matingly engage the outer surface of the inner support member,
   one of the outer surface of the inner support member and the inner surface of the outer support member defining a concave surface, the other of the one of the outer surface of the inner support member and the inner surface of the outer support member defining a convex surface, the outer support member and the inner support member collectively configured to be releasably coupled to an edge of an object having a substantially horizontal surface,
   the outer surface of the inner support member defining a concave surface, the inner surface of the outer support member defining a convex surface, the outer support member and the inner support member collectively configured to be releasably coupled to an edge of an object having a substantially horizontal surface,
   at least the outer support member defining a capture region configured to receive a portion of an article such that the article can be suspended from the object when the inner support member and the outer support member are coupled thereto.

2. The apparatus of claim 1, wherein the inner support member defines a notch on an inner surface configured to engage a corner of the edge of the object when the inner support member and the outer support member are coupled thereto.

3. The apparatus of claim 1, wherein the inner support member includes a substantially planar portion on an inner surface configured to engage at least a top surface of the object when the inner support member and the outer support member are coupled thereto.

4. The apparatus of claim 1, wherein the capture region is defined collectively by the outer support member and the inner support member.

5. The apparatus of claim 1, wherein the inner support member and the outer support member are concentric.

6. The apparatus of claim 1, wherein the inner support member and the outer support member are movable between a first configuration in which an opening defined by the inner support member at least partially aligns with an opening defined by the outer support member such that a portion of the article can be received therethrough and a second configuration in which the opening of the inner support member and the opening of the outer support member are misaligned.

7. The apparatus of claim 1, wherein the capture region is defined between the outer surface of the inner support member and the inner surface of the outer support member.

8. The apparatus of claim 1, wherein the outer support member includes a protruding portion, the capture region being defined at least in part by the protruding portion.

9. The apparatus of claim 1, wherein the inner support member and the outer support member are movable between a first configuration in which the inner support member and the outer support member define an opening configured to receive the edge of the object, and a second configuration in which the inner support member and the outer support member collectively define a closed interior region.

10. An apparatus, comprising:
an inner support member; and
an outer support member rotatably coupled to the inner support member, at least the outer support member defines a capture region configured to receive a portion of an article,
the inner support member and the outer support member being concentric and collectively defining an opening configured to receive a portion of an edge of an object having a substantially horizontal surface therethrough such that a portion of the inner support member contacts the object and a portion of the outer support member contacts the object to couple the inner support member and the outer support member to the object and such that the article can be suspended from the object when the portion of the article is disposed within the capture region; and
wherein the inner support member defines a notch configured to engage a corner of the edge of the object when the inner support member and the outer support member are coupled thereto, the notch comprising a first surface and a second surface where the first surface of the notch is substantially co-planar with a surface of the inner support member configured to contact the substantially horizontal surface of the object and the second surface of the notch is substantially perpendicular to the first surface.

11. The apparatus of claim 10, wherein the inner support member and the outer support member are radially disposed relative to each other.

12. The apparatus of claim 10, wherein one of an outer surface of the inner support member and an inner surface of the outer support member defines a concave surface and the other of the one of the outer surface of the inner support member and the inner surface of the outer support member defines a convex inner surface configured to matingly engage the concave surface.

13. The apparatus of claim 10, wherein the capture region is defined between an outer surface of the inner support member and an inner surface of the outer support member.

14. The apparatus of claim 10, wherein the outer support member includes a radially protruding portion, the capture region being defined at least in part by the protruding portion.

15. The apparatus of claim 10, wherein the inner support member and the outer support member are movable between a first configuration in which the inner support member and the outer support member define the opening and a second configuration in which the inner support member and the outer support member collectively define a closed interior region.

16. An apparatus, comprising:
an inner support member; and
an outer support member rotatably coupled to the inner support member, at least the outer support member defines a capture region configured to receive a portion of an article, the inner support member and the outer support member collectively having a first configuration in which the inner support member and the outer support member collectively define an opening configured to receive an edge of an object having a substantially horizontal surface to couple the inner support member and the outer support member collectively to the edge of the object such that the article can be suspended from the object when the portion of the article is disposed within the capture region,
the inner support member and the outer support member having a second configuration in which the inner support member and the outer support member define a closed interior region, the inner support member and the outer support member being concentric in both the first configuration and the second configuration; and
wherein the capture region is defined between an outer surface of the inner support member and an inner surface of the outer support member.

17. The apparatus of claim 16, wherein the inner support member and the outer support member are radially disposed relative to each other.

18. The apparatus of claim 16, wherein one of an outer surface of the inner support member and an inner surface of the outer support member defines a concave surface and the other of the one of the outer surface of the inner support member and the inner surface of the outer support member defines a convex inner surface configured to matingly engage the concave surface.

19. The apparatus of claim 16, wherein an inner surface of the inner support member defines a notch configured to engage a corner of the edge of the object when the inner support member and the outer support member are coupled thereto.

20. The apparatus of claim 16, wherein the outer support member includes a radially protruding portion, the capture region being defined at least in part by the protruding portion.

21. The apparatus of claim 16, wherein the inner support member and the outer support member are movable between a first configuration in which the inner support member and the outer support member define the opening and a second configuration in which the inner support member and the outer support member collectively define a closed interior region.

* * * * *

UNITED STATES PATENT AND TRADEMARK OFFICE
CERTIFICATE OF CORRECTION

PATENT NO. : 9,080,715 B2
APPLICATION NO. : 14/044118
DATED : July 14, 2015
INVENTOR(S) : Biddle et al.

Page 1 of 1

It is certified that error appears in the above-identified patent and that said Letters Patent is hereby corrected as shown below:

In the specification

Col. 1, line 59: "," should read — . —

Col. 5, line 41 (second occurrence): "of" should read — or —

Col. 6, line 27: "222" should read — 220 —

Col. 7, line 31: Delete "the" (first occurrence)

Col. 8, line 34: "back pack" should read — backpack —

Col. 9, line 4: "I" should read — in —

Col. 9, line 12: "back pack" should read — backpack —

Col. 11, line 45: After "they" insert -- have --

Col. 11, line 59: "except" should read — including —

Signed and Sealed this
Fourteenth Day of June, 2016

Michelle K. Lee
*Director of the United States Patent and Trademark Office*